(12) United States Patent
Shimoyama

(10) Patent No.: US 7,701,094 B2
(45) Date of Patent: Apr. 20, 2010

(54) MOTOR WITH TERMINAL BLOCK INTEGRALLY MOUNTED ON TERMINAL BLOCK MOUNTING PART AND MANUFACTURING METHOD THEREFOR

(75) Inventor: Takeshi Shimoyama, Nagano (JP)

(73) Assignee: Nidec Sankyo Corporation (JP)

( * ) Notice: Subject to any disclaimer, the term of this patent is extended or adjusted under 35 U.S.C. 154(b) by 160 days.

(21) Appl. No.: 11/831,406

(22) Filed: Jul. 31, 2007

(65) Prior Publication Data
US 2008/0048508 A1 Feb. 28, 2008

(30) Foreign Application Priority Data
Jul. 31, 2006 (JP) .............. 2006-207417

(51) Int. Cl.
H02K 37/12 (2006.01)
(52) U.S. Cl. .................... 310/49 R; 310/71
(58) Field of Classification Search ........... 310/71, 310/257, 49 R, 194
See application file for complete search history.

(56) References Cited

U.S. PATENT DOCUMENTS

| | | | |
|---|---|---|---|
| 6,455,962 B2 * | 9/2002 | Suzuki et al. .......... | 310/71 |
| 6,933,636 B2 * | 8/2005 | Miya et al. .......... | 310/71 |
| 7,309,936 B2 * | 12/2007 | Utsumi et al. .......... | 310/71 |
| 7,375,446 B2 * | 5/2008 | Suzuki et al. .......... | 310/86 |
| 2004/0021375 A1 * | 2/2004 | Mayumi .......... | 310/49 R |
| 2005/0046305 A1 * | 3/2005 | Matsushita et al. .......... | 310/257 |
| 2008/0084125 A1 * | 4/2008 | Ohkawa et al. .......... | 310/43 |

FOREIGN PATENT DOCUMENTS

JP 2004-112985 4/2004

* cited by examiner

Primary Examiner—Michael C Zarroli
(74) Attorney, Agent, or Firm—Cantor Colburn LLP

(57) ABSTRACT

A motor may include a rotor having a rotor shaft and a magnet, at least a stator core disposed around the rotor and provided with a plurality of pole teeth, and at least a coil mounted on the stator core. The stator core includes a terminal block mounting part which is formed so as to protrude on an outer side from the stator core, and a terminal block supporting terminals for the coil is integrally mounted on the terminal block mounting part. The terminal block mounting part may be formed with at least an engaging protruded part and the terminal block is integrated with the engaging protruded part by insert molding or outsert molding.

12 Claims, 6 Drawing Sheets

Fig. 3 (b)
Fig. 3 (a)
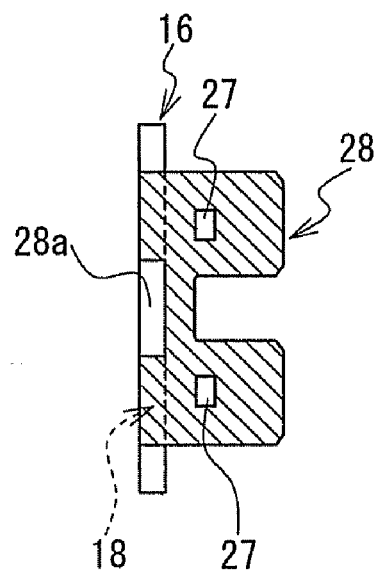
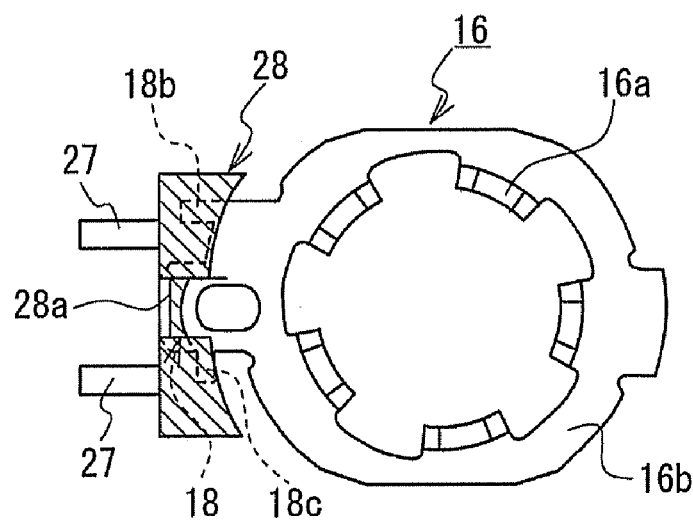
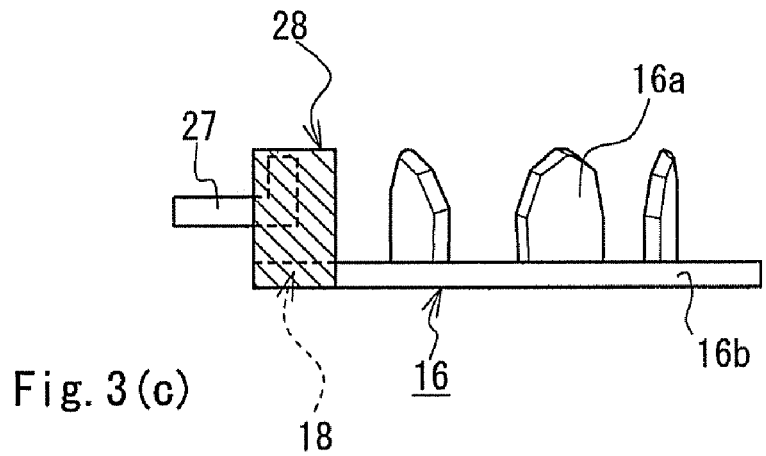
Fig. 3 (c)

Fig. 4(b)
Fig. 4(a)
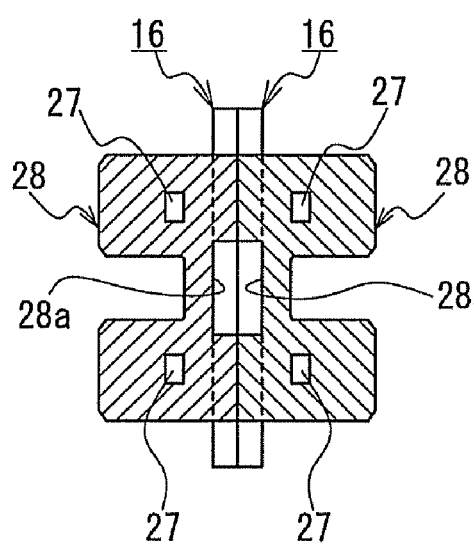
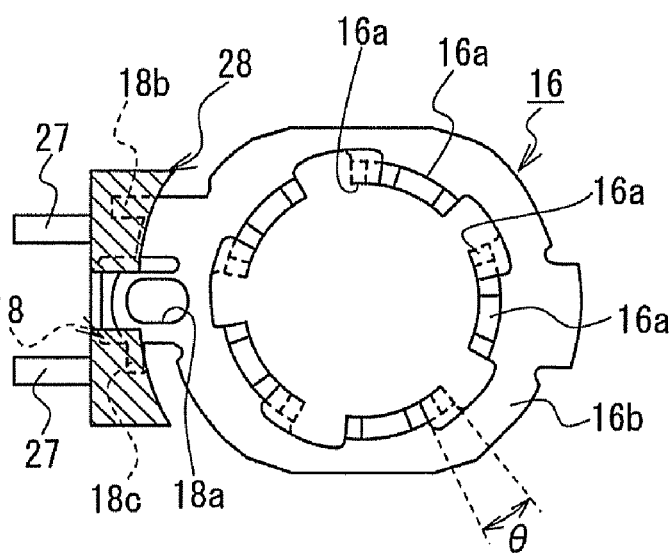
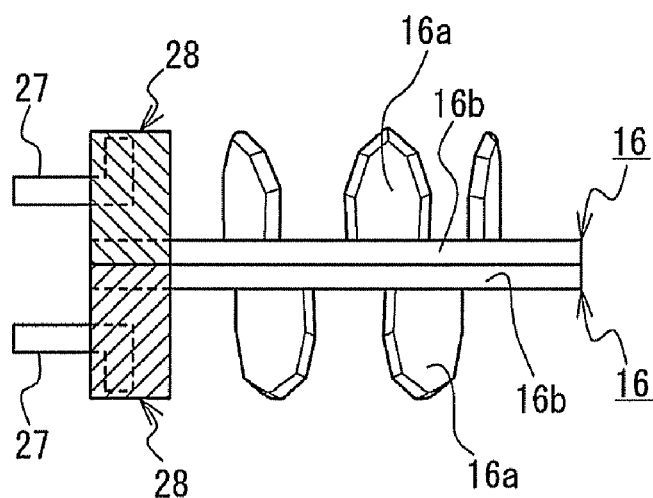
Fig. 4(c)

MOTOR WITH TERMINAL BLOCK INTEGRALLY MOUNTED ON TERMINAL BLOCK MOUNTING PART AND MANUFACTURING METHOD THEREFOR

CROSS REFERENCE TO RELATED APPLICATION

The present invention claims priority under 35 U.S.C. §119 to Japanese Application No. 2006-207417 filed Jul. 31, 2006, which is incorporated herein by reference.

FIELD OF THE INVENTION

An embodiment of the present invention may relate to a motor and a manufacturing method for the motor. More specifically, an embodiment of the present invention may relate to a mounting structure of a terminal block which is mounted on a stator core on which a coil is mounted and to its manufacturing method.

BACKGROUND OF THE INVENTION

A conventional PM type (Permanent Magnet Type) stepping motor 100 in which a permanent magnet is used in a rotor has been known as described, for example, in Japanese Patent Laid-Open No. 2004-112985.

A schematic structure of the conventional stepping motor will be described as follows with reference to FIG. 6. A pair of inner stator cores 104 for two phases are superposed on each other in a back-to-back manner. A plurality of pole teeth 106 is formed upright at an inner circumferential edge of the respective stator cores 104 at nearly equal intervals, and bobbin-less coils 110 are respectively mounted on the outer periphery of the pole teeth 106. A rotor 116 in which a magnet (permanent magnet) 114 is integrally fixed to a rotor shaft 112 is rotatably supported on mounting plates 120 through bearings 118 on an inner peripheral side of the pole teeth 106 of the inner stator cores 104.

Outer stator cores 122 are assembled to the inner stator cores 104 and a plurality of pole teeth is formed at an inner circumferential edge of the respective outer stator cores 122 so as to be alternately disposed to the pole teeth 106 of the inner stator core 104.

In the stepping motor 100 which is structured as described above, wire ends 110a of coils 110 are wound around terminal pins 102 provided on the respective inner stator cores 104. An electric current is supplied to the respective coils 110 through the terminal pins 102 and, as a result, a rotation drive force is applied to the rotor shaft 112 by generated magnetic field and rotation is outputted from one end side of the rotor shaft 112.

In the stepping motor 100 as described above, a terminal block 130 supporting the terminal pins 102 is mounted on the inner stator core 104 by adhesively bonding with an adhesive.

However, when the terminal block 130 is mounted by adhesively bonding with an adhesive, mounting position of the terminal block 130 on the inner stator core 104 may be easily displaced and the terminal block 130 may be easily mounted in an inclined state. In addition, the terminal block 130 is formed of resin and the inner stator core 104 is formed of metal and thus, when adhesive strength is low, a problem may occur, for example, the terminal block 130 is disengaged from the inner stator core 140.

As described above, when a problem such as displacement of the mounting position or disengagement of the terminal block 130 from the inner stator core 104 may occur due to low fixing strength of the terminal block 130 to the inner stator core 104, the wire end of the coil 110 connected to the terminal pin which is supported to the terminal block 130 may be disengaged or the wire end may be disconnected and thus an electric current is unable to be supplied to the coil 110 stably, which causes a problem in control for the stepping motor 100.

SUMMARY OF THE INVENTION

In view of the problems described above, an embodiment of the present invention may advantageously provide a motor in which a terminal block that supports terminal pins is integrally and firmly mounted on a stator core and in which the terminal block is not easily disengaged from the stator core and provide a manufacturing method for the motor.

Thus, according to an embodiment of the present invention, there may be provided a motor including a rotor having a rotor shaft and a magnet fixed to the rotor shaft, at least a stator core which is disposed around the rotor and which is provided with a plurality of pole teeth that is formed at an inner circumferential edge of the stator core, and at least a coil which is mounted on an outer periphery of the plurality of pole teeth. In this motor, the stator core includes a terminal block mounting part which is formed so as to protrude on an outer side in a radial direction from the stator core, and a terminal block which supports terminals with which coil ends of the coil is connected is integrally mounted on the terminal block mounting part. In this case, the stator core may include a circular ring shaped base portion, the plurality of pole teeth which is formed at an inner circumferential edge of the base portion, and the terminal block mounting part which is protruded on an outer side from an outer peripheral edge of the base portion.

In accordance with an embodiment of the present invention, a terminal block which supports terminals with which coil ends of the coil is connected is integrally mounted on a terminal block mounting part which is formed in the stator core. Therefore, the terminal block is firmly fixed to the stator core and thus the terminal block is prevented from being inclined or from being disengaged from the stator core. As a result, the coil end of the coil mounted on the stator core is prevented from disconnecting from the terminal to cause poor contact.

In this embodiment, it is preferable that the terminal block mounting part is formed with at least an engaging protruded part and the terminal block is integrated with the engaging protruded part by insert molding or outsert molding. According to this structure, the terminal block is engaged with the engaging protruded part and thus the terminal block is firmly fixed to the stator core. Therefore, the terminal block is prevented from being disengaged from the stator core. In this case, it is preferable that the terminal block mounting part includes a plurality of engaging protruded parts which are formed to extend in different directions to each other.

In addition, it is preferable that the terminal block is provided with an opening part through which an end face of the terminal block mounting part is capable of being visually observed. In this embodiment, for example, when the stator cores are used in a state that they are superposed in a back-to-back manner, the stator cores can be fixed to each other through the opening part by welding exposed end faces of the terminal block mounting parts.

Further, it is preferable that the stator core comprises a first stator core and a second stator core which are superposed on each other in a back-to-back manner so that the respective pole teeth are disposed in opposite directions to each other, and the terminal block mounting parts of the first stator core and the second stator core are respectively formed with a positioning hole. According to this embodiment, the stator cores are aligned or positioned precisely by using the positioning holes and thus a stepping motor having a stable quality can be obtained and yield of the motor can be improved.

Further, according to an embodiment of the present invention, there may be provided a manufacturing method for a motor in which a terminal block, which supports terminals with which coil ends of the coil is to be connected, is integrally formed on the terminal block mounting part by insert molding or outsert molding with synthetic resin.

According to the manufacturing method for a motor in accordance with an embodiment of the present invention, a terminal block is firmly fixed to the stator core and thus the terminal block is prevented from being inclined or from being disengaged from the stator core. Therefore, a motor is obtained in which a terminal block is firmly fixed to the stator core and, in addition, a motor having a stable quality can be obtained and yield of the motor can be improved.

In this case, it is preferable that at least an engaging protruded part is formed in the terminal block mounting part and then, the terminal block is integrated with the engaging protruded part when the terminal block is formed by the insert molding or outsert molding. Further, it is preferable that an opening part through which an end face of the terminal block mounting part is capable of being visually observed is formed in the terminal block.

Further, it is preferable that the stator core comprises a first stator core and a second stator core and, positioning holes are previously formed in the terminal block mounting parts of the first stator core and the second stator core, and then the first stator core and the second stator core are positioned or aligned with each other through the positioning holes when the first stator core and the second stator core are superposed on each other in the back-to-back manner so that the respective pole teeth are disposed in opposite directions to each other and, after that, the terminal block is formed by the insert molding or outsert molding.

In this case, it is preferable that, after the terminal blocks have been formed in the first stator core and the second stator core, the terminal block mounting parts of the first stator core and the second stator core are fixed to each other through the opening part by utilizing welding or the like.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3(a) is a top plan view showing a state where a terminal block is mounted on the stator core shown in FIGS. 2(a) and 2(b), and FIGS. 3(b) and 3(c) are its side views.

FIG. 4(a) is a top plan view showing a state where the stator cores on which the terminal block is mounted are superposed on each other in a back-to-back manner, and FIGS. 4(b) and 4(c) are its side views.

DETAILED DESCRIPTION OF THE PREFERRED EMBODIMENTS

Figure 1:
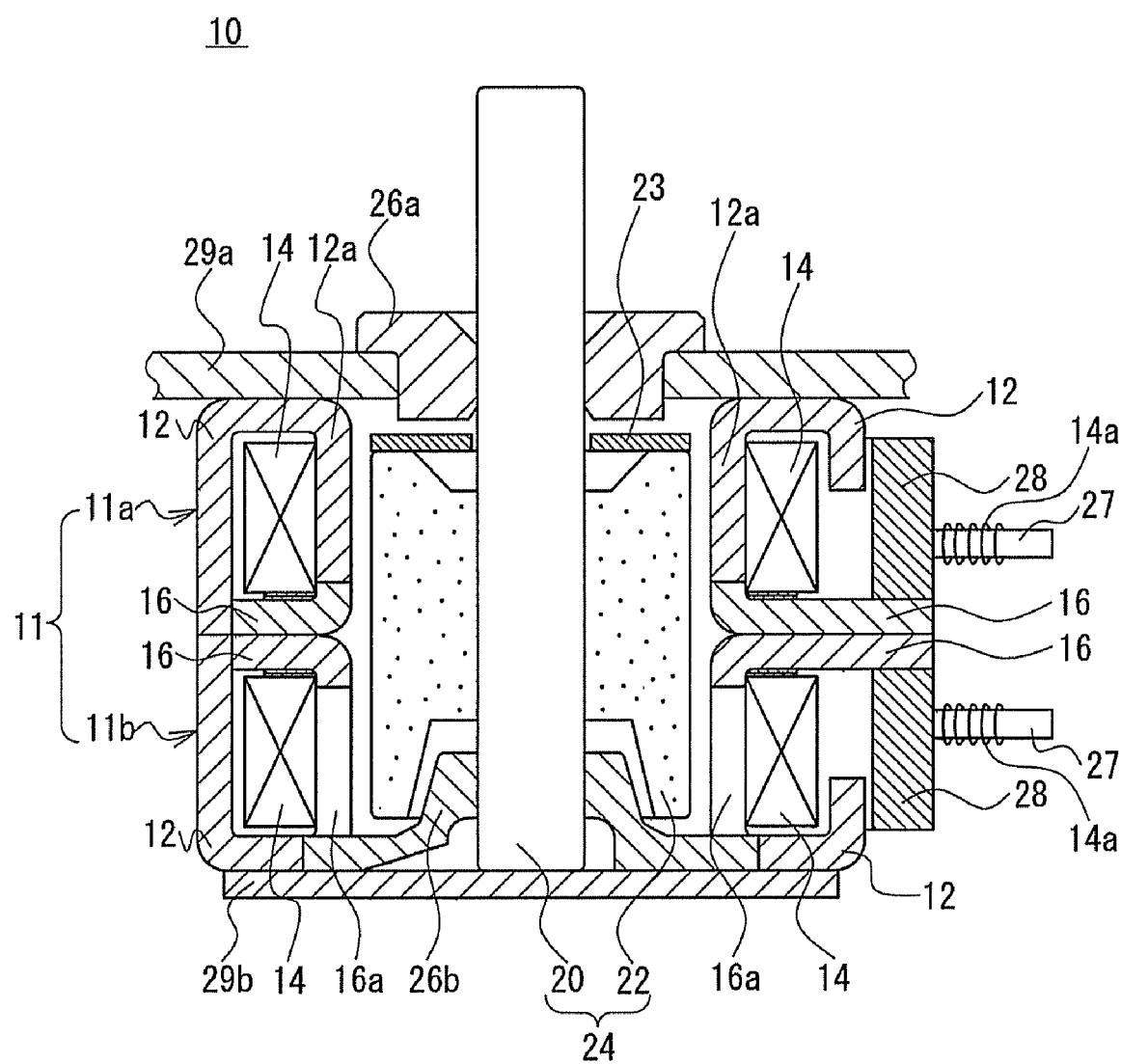
FIG. 1 is a cross-sectional view showing a structure of a stepping motor in accordance with an embodiment of the present invention.

A stepping motor in accordance with an embodiment of the present invention will be described in detail below with reference to the accompanying drawings. FIG. 1 is a cross-sectional view showing a schematic structure of a stepping motor 10 in accordance with an embodiment of the present invention. The stepping motor 10 in this embodiment includes, as shown in the drawing, a rotor 24 provided with a rotor shaft 20 and a cylindrical magnet 22 (permanent magnet) which is fixed to an outer peripheral face of the rotor shaft 20 and a stator 11 which is disposed so as to surround the rotor 24.

The stator 11 is structured in a two-phase structure with a first stator assembly 11a and a second stator assembly 11b which is fixed to the first stator assembly 11a in a back-to-back manner. In this embodiment, since basic structures of the first stator assembly 11a and the second stator assembly 11b are the same, the same notational symbols are used in common portions.

The first stator assembly 11a and the second stator assembly 11b are respectively structured of the inner stator core 16, the outer stator core 12 and a bobbin-less coil 14 which is not provided with a coil bobbin.

The bobbin-less coil 14 is mounted on the inner stator core 16 and a pair of the inner stator cores 16 is superposed on each other in a back-to-back manner. A plurality of pole teeth 16a is circumferentially formed upright at an inner circumferential edge of the respective inner stator cores 16 at substantially equal intervals.

The outer stator cores 12 are respectively assembled to the inner stator cores 16. Similarly to the inner stator core 16, a plurality of pole teeth 12a is circumferentially formed upright at an inner circumferential edge of the respective outer stator cores 12. The pole teeth 16a of the inner stator core 16 and the pole teeth 12a of the outer stator core 12 are disposed in an alternately adjacent manner in a circumferential direction.

The bobbin-less coil 14 is mounted on the inner stator core 16 so that an inner peripheral face of the bobbin-less coil 14 faces an outer peripheral face of the pole teeth 16a of the inner stator core 16 and the pole teeth 12a of the outer stator core 12. Further, a terminal block 28 to which terminal pins 27 are fixed is integrally attached or mounted on a terminal block mounting part 18 at an outer peripheral edge of the inner stator core 16. Terminal pins 27 are connected to the coil ends 14a of the bobbin-less coil 14. In this embodiment, the outer stator core 16 is formed to be used as a motor case.

The rotor 24 which is structured of the magnet 22 integrally provided around the rotor shaft 20 is disposed in a center portion of the stator 11 as structured above through a specified clearance.

A mounting plate 29a which is utilized as a fixing plate when the stepping motor 10 is mounted on an apparatus is fixed to the outer stator core 12 of the first stator assembly 11a. The mounting plate 29a is fixed with a first radial bearing 26a which rotatably supports the rotor shaft 20 on an output side.

A second radial bearing 26b which rotatably supports the rotor shaft 20 on an opposite-to-output side is fixed to the outer stator core 12 of the second stator assembly 11b. In addition, a side plate 29b is fixed to the outer stator core 12 of the second stator assembly 11b and a shaft end of the rotor shaft 20 is rotatably supported by the side plate 29b in a thrust direction.

In other words, the rotor 24 is rotatably supported by the first radial bearing 26a, the second radial bearing 26b and the side plate 29b. Further, one end portion of the rotor shaft 20 of the rotor 24 is protruded on an outer side (output side) from the outer stator core 12 of the first stator assembly 11a to be formed as an output shaft for rotational drive.

A washer 23 made of resin is disposed between the first radial bearing 26a and the magnet 22 to regulate movement of the rotor 24 to the output side.

Terminal blocks 28 which support the terminal pins 27 for supplying electric power to the respective bobbin-less coils 14 are fixed to the respective inner stator cores 16. An alternating current is supplied to the bobbin-less coils 14 through the terminal pins 27 and rotating magnetic field is generated. Magnetic rotary force is applied to the magnet 22 of the rotor 24 by the rotating magnetic field and thus the rotor shaft 20 is rotationally driven together with the magnet 22.

In the stepping motor 10 having the structure as described above, mounting of the terminal block 28 which supports the terminal pins 27 on the inner stator core 16 is performed as follows.

Figure 2A:
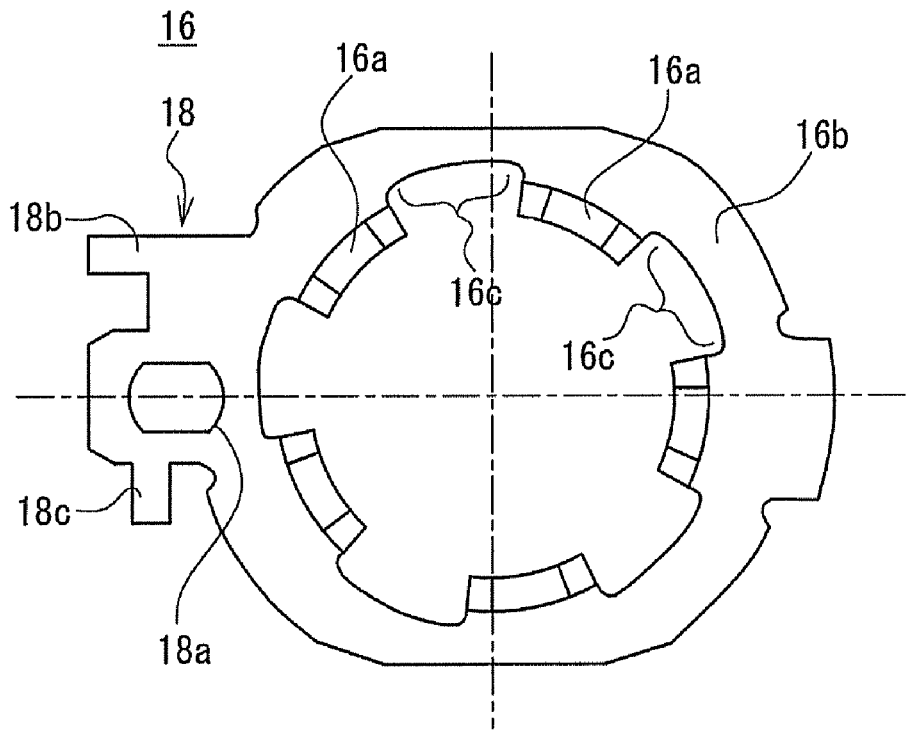
FIG. 2(a) is a top plan view showing a stator core of the stepping motor shown in FIG. 1
Figure 2B:
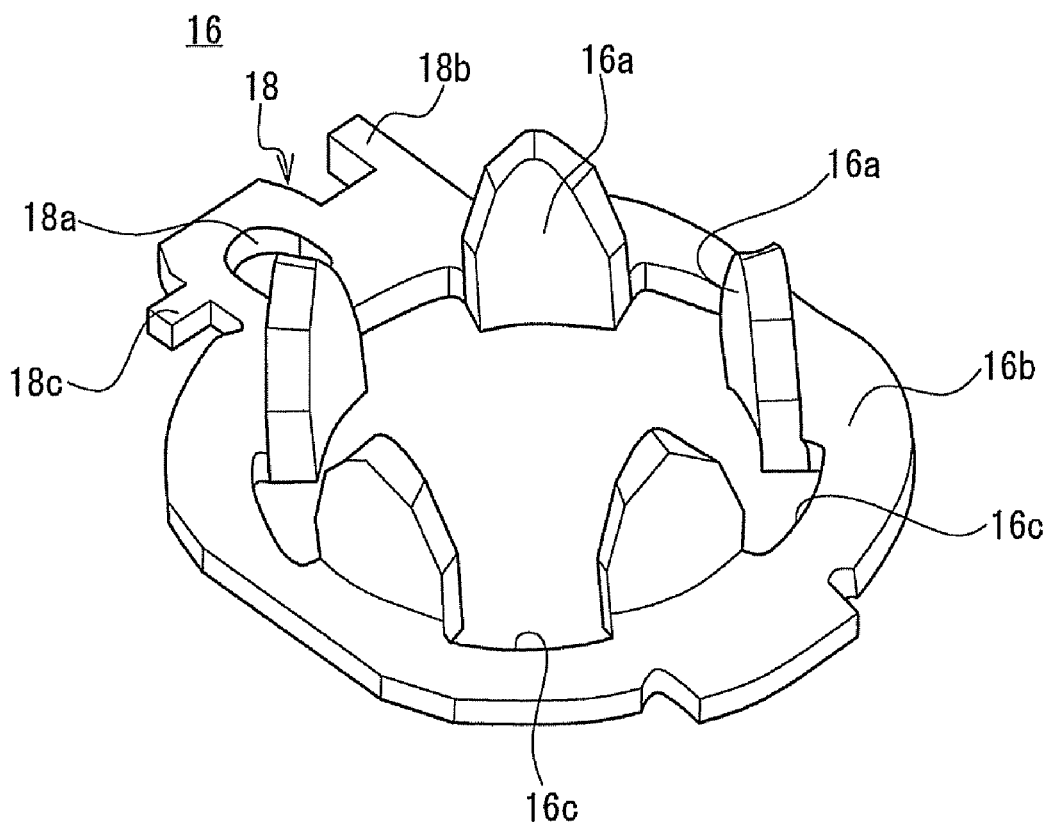
FIG. 2(b) is its perspective view.

FIG. 2(a) is a top plan view showing the inner stator core 16 on which the terminal block 28 is not mounted yet and FIG. 2(b) is its perspective view. As shown in FIG. 2(a), in this embodiment, the inner stator core 16 is provided with a ring-shaped base portion 16b on which the bobbin-less coil 14 is mounted. An outer peripheral edge part of the base portion 16b is formed in a roughly circular shape and a plurality of pole teeth 16a is formed upright at its inner circumferential edge at substantially equal intervals of a circle through connection parts 16c.

A terminal block mounting part 18 for mounting the terminal block 28 which supports the terminal pins 27 is formed at an outer peripheral edge of the base portion 16b of the inner stator core 16 so as to protrude from the base portion 16b of the inner stator core 16 on an outer side in a radial direction. The terminal block mounting part 18 is formed with a positioning hole 18a for positioning or aligning a pair of the inner stator cores 16 whose base portions 16b are superposed on each other in a back-to-back manner.

The terminal block mounting part 18 is formed with a plurality of engaging protruded parts 18b and 18c for preventing the terminal block 28 from being disengaged. The engaging protruded part 18b is formed so as to protrude in a roughly same direction as the radial direction of the roughly circular inner stator core 16 from a base portion of the terminal block mounting part 18. Further, the engaging protruded part 18c is formed so as to protrude from a side face of an intermediate portion of the terminal block mounting part 18 in a direction so as to cross the direction of the engaging protruded part 18, preferably, in a direction perpendicular to the direction of the engaging protruded part 18b. In other words, the engaging protruded parts 18b and 18c are formed to protrude in directions perpendicular to each other but they may be formed to protrude in different directions from each other.

The inner stator core 16 is manufactured such that a magnetic steel plate such as iron is punched, bent and formed.

A state where the terminal block 28 is mounted on the terminal block mounting part 18 is shown in FIGS. 3(a) through 3(c). FIG. 3(a) is a top plan view showing the inner stator core 16 on which the terminal block 28 is mounted, FIG. 3(b) is a side view which is viewed from a left side in FIG. 3(a) and FIG. 3(c) is a side view which is viewed from a lower side in FIG. 3(a).

As shown in FIG. 3(a), the terminal block 28 is integrally mounted on the terminal block mounting part 18 of the inner stator core 16. The engaging protruded parts 18b and 18c formed in the terminal block mounting part 18 of the inner stator core 16 are buried in the terminal block 28. The engaging protruded parts 18b and 18c are formed to extend in different directions from each other and thus the terminal block 28 is firmly fixed to the inner stator core 16.

When the terminal block 28 is to be mounted on the inner stator core 16, insert molding or outsert molding may be applied. The terminal block mounting part 18 of the inner stator core 16 as shown in FIGS. 2(a) and 2(b) which has been manufactured in advance is loaded in a specified molding die (not shown) corresponding to the shape of the terminal block 28 and then resin is injected into the molding die to wrap an inserted member with the molten resin and the molten resin is hardened. As a result, the terminal block 28 is integrally formed with the inner stator core 16. Synthetic resin material having heat resistance and insulation property such as liquid crystal polymer or the like is preferably used as resin material for forming the terminal block 28.

The terminal pin 27 is mounted to the terminal block 28 so that a base portion of the terminal pin 27 is disposed within the molding die and buried in the terminal block 28 and its front side portion is protruded from the terminal block 28. The base end portion which is buried in the terminal block 28 is formed bent in a wedge-like shape at its middle portion and, even when the front side portion which is protruded from the terminal block 28 is pulled outward, the terminal pin 27 is not removed from the terminal block 28.

As shown in FIGS. 3(a) and 3(b), the terminal block 28 which is fixed to the terminal block mounting part 18 by insert molding or outsert molding is formed with a cutout portion which is an opening part 28a through which an end face of the terminal block mounting part 18 is capable of being visually observed. A metal end face of the terminal block mounting part 18 is exposed from the opening part 28a. As described below, when a pair of the inner stator cores 16 is superposed on each other in a back-to-back manner and is to be fixed to each other, the inner stator cores 16 are fixed to each other by welding the tip ends of the terminal block mounting parts 18 which are exposed from the opening part 28a.

As shown in FIG. 3(c), the inner stator core 16 and the terminal pins 27 are integrated in an electrically insulated state through the terminal block 28 made of synthetic resin having heat resistance and insulation property so as not to contact with each other.

Next, a manufacturing method where a pair of the inner stator cores 16 are superposed on each other in a back-to-back manner so that the respective pole teeth 16a are formed upright on opposite directions to each other will be described with reference to FIGS. 4(a) through 4(c). FIG. 4(a) is a top plan view showing a state where the inner stator cores 16 on which the terminal block 28 is mounted are superposed on each other in a back-to-back manner, FIG. 4(b) is a side view which is viewed from a left side in FIG. 4(a) and FIG. 4(c) is a side view which is viewed from a lower side in FIG. 4(a).

As shown in FIG. 1, when the inner stator core 16 (first inner stator core 16) of the first stator assembly 11a and the inner stator core 16 (second inner stator core 16) of the second stator assembly 11b are superposed on each other for two phases in a back-to-back manner, the first and the second inner stator cores 16 are aligned or positioned to each other through the positioning holes 18a which are respectively provided in the terminal block mounting parts 18. When the first inner stator core 16 and the second inner stator core 16 are superposed on each other in the back-to-back manner at correct positions, the positioning holes 18a of the terminal block mounting parts 18 are overlapped with each other. Therefore, the first inner stator core 16 and the second inner stator core 16 are precisely aligned with each other by inserting a bar-shaped jig through the positioning holes 18a.

In this case, as shown in FIGS. 4(a) and 4(b), a plurality of pole teeth 16a of the first inner stator core 16 and a plurality of pole teeth 16a of the second inner stator core 16 are disposed so as to shift by a specified phase "θ". In this manner, the first inner stator core 16 and the second inner stator core 16 are accurately aligned and positioned to each other through the positioning holes 18a provided in the terminal block mounting parts 18. Therefore, the phase "θ" is accurately adjusted and thus dispersion of performance such as a stepping angle of the stepping motor 10 is restrained, reliability is enhanced and product yield is improved.

After the first inner stator core 16 and the second inner stator core 16 have been accurately positioned to each other as described above, the terminal block 28 which supports the terminal pins 27 is integrally formed on the terminal block mounting parts 18. The terminal block 28 is formed of synthetic resin material such as liquid crystal polymer having heat resistance and insulation property. The terminal block 28 is integrally and simultaneously formed on the terminal block mounting part 18 of the first inner stator core 16 and on the terminal block mounting part 18 of the second inner stator core 16 by insert molding or outsert molding.

In this case, as shown in FIG. 4(a), the engaging protruded parts 18b and 18c are buried in the resin terminal block 28 which is formed on the terminal block mounting parts 18 of the first and the second inner stator cores 16. In addition, the engaging protruded parts 18b and 18c are protruded in different directions from each other and thus the terminal block 28 is firmly fixed to the inner stator cores 16 and the terminal block 28 is prevented from inclining or being disengaged.

Further, as shown in FIG. 4(b), the terminal block 28 is provided with a cutout portion, i.e., an opening part 28a through which tip ends of the terminal block mounting parts 18 are visually observed. Therefore, since metal faces of the tip ends of the terminal block mounting parts 18 are exposed from the opening part 28a, the first inner stator core 16 and the second inner stator core 16 are fixed to each other in an accurately aligned and positioned state by welding these exposed portions with laser welding or the like.

Figure 5A:
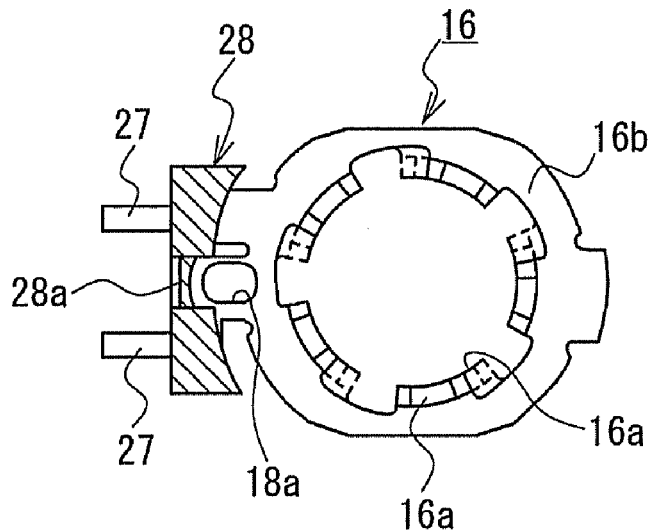
FIGS. 5(a), 5(b) and 5(c) are plan views showing steps in which a bobbin-less coil is mounted on the stator core in accordance with an embodiment of the present invention.

A step for mounting the bobbin-less coil 14 on the inner stator core 16 on which the terminal block 28 has been mounted as described above will be described below with reference to FIGS. 5(a) through 5(c). As shown in FIG. 5(a), the inner stator core 16 is provided with a plurality of pole teeth 16a which is formed upright at an inner circumferential edge of the base portion 16b on which the bobbin-less coil 14 is to be placed. The terminal block 28 having the terminal pins 27 is formed on the terminal block mounting part 18 of the inner stator core 16 which is formed on an outer peripheral portion of the base portion 16b.

On the other hand, the bobbin-less coil 14 is formed which is to be mounted on an outer peripheral face of the pole teeth 16a of the inner stator core 16. A self fused layer is provided on a surface of a coil wire which forms the bobbin-less coil 14 and thus, even when a coil bobbin is not provided, shape and insulation of the coil 14 is maintained.

Figure 5B:
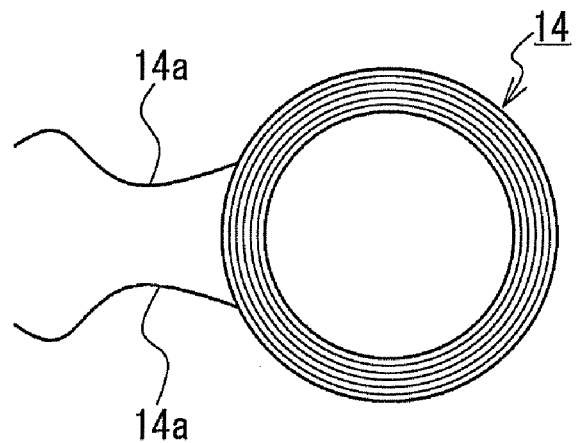
Figure 5C:
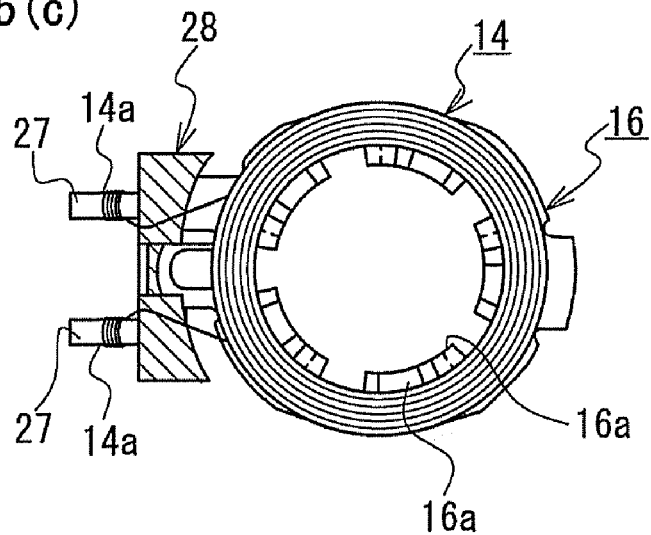
Figure 6:
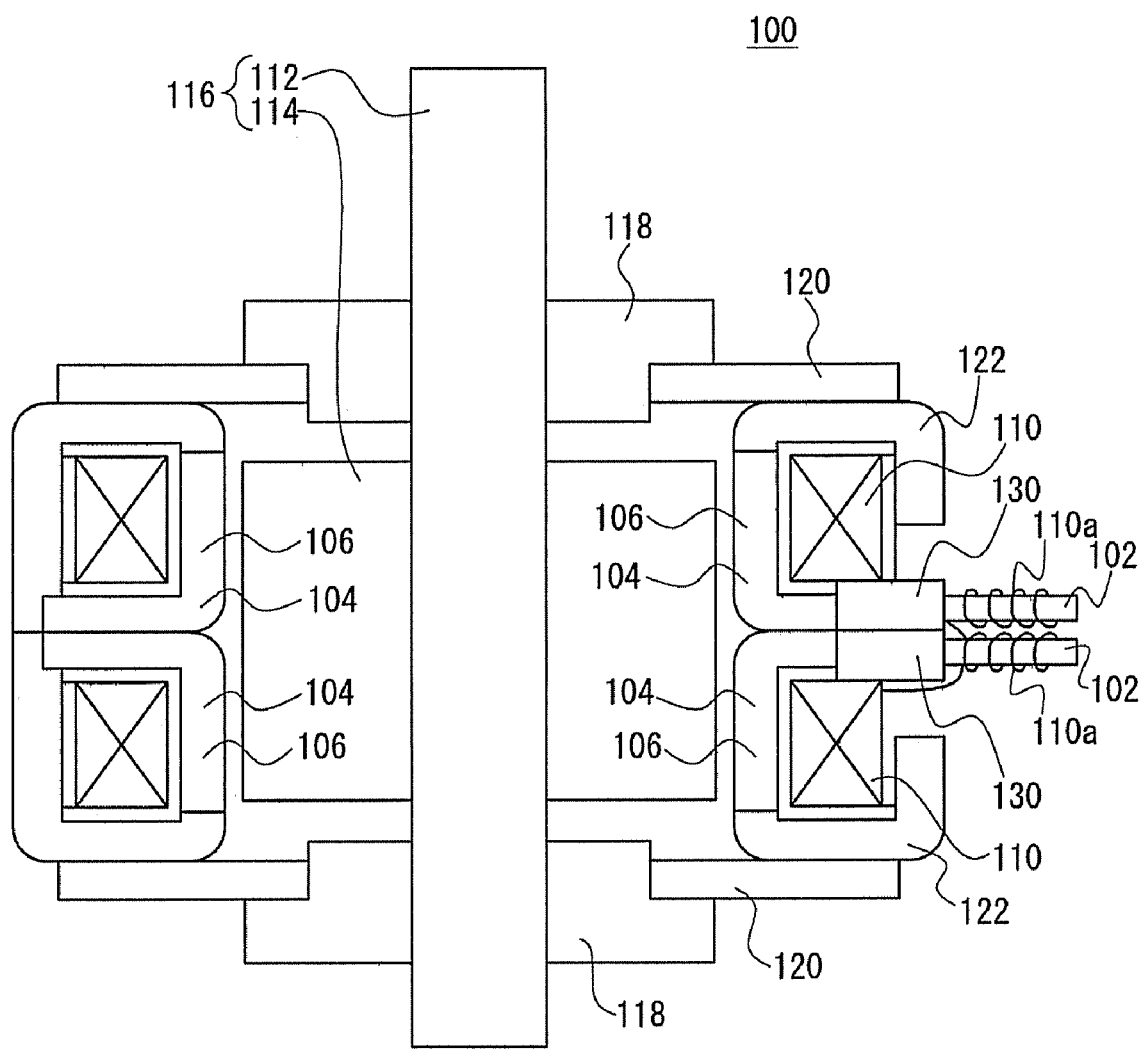
FIG. 6 is a cross-sectional view showing a schematic structure of a conventional stepping motor.

The bobbin-less coil 14 shown in FIG. 5(b) is mounted on the outer peripheral face of the pole teeth 16a of the inner stator core 16 (see FIG. 5(c)). In this case, it is preferable that an adhesion member such as an insulating adhesion tape is provided on a contact face, i.e., the base portion 16b of the inner stator core 16 with the bobbin-less coil 14. According to this structure, the bobbin-less coil 14 is fixed to the inner stator core 16 through the insulating adhesion tape and insulation between the bobbin-less coil 14 and the inner stator core 16 is further surely secured. After the coil ends 14a of the bobbin-less coil 14 have wound around the terminal pins 27, the coil ends 14a are soldered with the terminal pins 27. As a result, electric power can be supplied to the bobbin-less coil 14 through the terminal pins 27.

Although the present invention has been shown and described with reference to specific embodiments, various changes and modifications will be apparent to those skilled in the art from the teachings herein.

For example, when the terminal block 28 is to be insert-molded on the terminal block mounting part 18 of the inner stator core 16, base portions of the terminal pins 27 are loaded to a molding die, and the inner stator cores 16, the terminal block 28 and the terminal pins 27 may be integrally and simultaneously formed by insert-molding. Further, the terminal block mounting part 18 at the opening part 28a provided in the terminal block 28 may be formed or covered with resin film in an extent that the resin film does not prevent welding between the inner stator cores 16 which are superposed on each other in a back-to-back manner.

As described above, in accordance with an embodiment of the present invention, the terminal block 28 supporting the terminal pins 27 is integrally mounted on the terminal block mounting parts 18 of the inner stator cores 16. Therefore, the terminal block 28 is firmly fixed to the inner stator cores 16. Accordingly, the terminal block 28 is prevented from being inclined or from being disengaged from the inner stator core 16 and the coil end 14a of the coil 14 mounted on the inner stator core 16 is prevented from disconnecting from the terminal pin 27 and causing poor contact. As a result, a stepping motor having a stable quality can be obtained and yield of product can be improved.

Further, since the engaging protruded parts 18b and 18c are provided in the terminal block mounting part 18, the terminal block 28 which is integrally mounted on the terminal block mounting part 18 by insert molding or outsert molding is engaged with and locked to the engaging protruded parts 18b and 18c. Therefore, the terminal block 28 is firmly fixed to the inner stator core 16.

In addition, the opening part 28a, which is capable of visually observing the end face of the terminal block mounting part 18 and where metal face of the terminal block mounting part 18 is exposed, is formed in the terminal block 28. Therefore, when the inner stator cores 16 are used in a state that they are superposed on each other in a back-to-back manner, the inner stator cores 16 can be fixed to each other through the opening part 28a.

Further, since the positioning holes 18a which are used when a pair of the inner stator cores 16 are superposed on each other in a back-to-back manner are formed in the terminal block mounting parts 18, the inner stator cores 16 can be aligned or positioned precisely.

In this case, the first inner stator core 16 and the second inner stator core 16 are fixed to each other by welding through the opening part 28a and thus the first inner stator core 16 and the second inner stator core 16 can be fixed to each other firmly. In addition, the first and the second inner stator cores 16 are formed with the terminal block mounting part 18 and thus the terminal block 28 is integrally fixed to the first and the second inner stator cores 16 strongly.

According to the manufacturing method for a stepping motor as described above, the stepping motor 10 can be obtained in which the terminal block 28 is firmly fixed to the inner stator cores 16. Therefore, the terminal block 28 is prevented from being inclined or disengaged from the inner stator core 16a. As a result, a stepping motor having a stable quality can be obtained and yield of product can be improved together with the effects as described above.

In the embodiment described above, the engaging protrusion parts 18b and 18c are provided in the terminal block mounting part 18. However, the number or shape of the engaging protrusion part is not limited to the embodiment and any mechanism capable of preventing the terminal block 28 from disengaging from the terminal block mounting part 18 may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
    a rotor which includes a rotor shaft and a magnet fixed to the rotor shaft;
    a stator core disposed around the rotor, the stator core comprising:
        a ring shaped base portion;
        a plurality of pole teeth which is formed at an inner circumferential edge of the ring shaped base portion; and
        a terminal block mounting part which is protruded on an outer side from an outer peripheral edge of the ring shaped base portion and which is provided with at least an engaging protruded part;
    a coil which is mounted on an outer periphery of the plurality of pole teeth;
    terminals with which coil ends of the coil are connected; and
    a terminal block made of synthetic resin to which the terminals are fixed;
    wherein the terminal block is integrally formed on the terminal block mounting part of the stator core so that the terminal block is engaged with the engaging protruded part of the terminal block mounting part through insert molding or outsert molding.

2. The motor according to claim 1, wherein the terminal block is provided with an opening part through which an end face of the terminal block mounting part is capable of being visually observed.

3. The motor according to claim 1, wherein
    the stator core comprises a first stator core and a second stator core which are superposed on each other in a back-to-back manner so that the respective pole teeth are disposed in opposite directions to each other, and
    each of the terminal block mounting parts of the first stator core and the second stator core is respectively formed with a positioning hole.

4. The motor according to claim 3, wherein the terminal block mounting parts of the first stator core and the second stator core are fixed to each other in a state where the first stator core and the second stator core are positioned through the positioning holes.

5. The motor according to claim 1, wherein the terminal block mounting part includes a plurality of engaging protruded parts which are formed to extend in different directions to each other.

6. The motor according to claim 1, wherein
    the stator core comprises a first stator core and a second stator core which are superposed on each other in a back-to-back manner so that the respective pole teeth are disposed in opposite directions to each other,
    each of the terminal block mounting parts of the first stator core and the second stator core is respectively formed with a positioning hole,
    the ring shaped base portion of each stator core and the terminal block mounting part protruded from the outer peripheral edge of the ring shaped base portion are formed in a same flat face,
    the ring shaped base portions and the terminal block mounting parts of the first stator core and the second stator core are abutted with each other when the first stator core and the second stator core are superposed on each other in a back-to-back manner, and
    the positioning holes of the first stator core and the second stator core are aligned with each other.

7. The motor according to claim 6, wherein
    each of the terminal block mounting parts is formed with at least an engaging protruded part and the terminal block is integrated with the engaging protruded part by insert molding or outsert molding,
    the terminal block is provided with an opening part through which an end face of the terminal block mounting part is capable of being visually observed, and
    the first stator core and the second stator core are fixed to each other in a state that the first stator core and the second stator core are superposed on each other in the back-to-back manner and that end faces of the terminal block mounting parts which are exposed through the opening part of the terminal block mounted on the first stator core and the second stator core are welded.

8. The motor according to claim 1, wherein the coil is a bobbin-less coil which is not provided with a coil bobbin.

9. A manufacturing method for a motor including a rotor having a rotor shaft and a magnet fixed to the rotor shaft, a stator core and a coil which are disposed around the rotor, the method comprising:
    preparing the stator core, wherein the stator core comprises:
        a ring shaped base portion
        a plurality of pole teeth which is formed at an inner circumferential edge of the ring shaped base portion; and
        a terminal block mounting part which is protruded on an outer side from an outer peripheral edge of the ring shaped base portion; and
    integrally forming a terminal block, to which terminals for the coil are fixed, on the terminal block mounting part by insert molding or outsert molding with synthetic resin;
    wherein at least an engaging protruded part is previously formed in the terminal block mounting part and, when the terminal block is integrally formed on the terminal block mounting part by the insert molding or outsert molding, the engaging protruded part is simultaneously engaged with the terminal block.

10. The manufacturing method for a motor according to claim 9, wherein when the terminal block is integrally formed on the terminal block mounting part by the insert molding or outsert molding, an opening part through which an end face of the terminal block mounting part is capable of being visually observed is simultaneously formed in the terminal block.

11. The manufacturing method for a motor according to claim 10, wherein the stator core comprises a first stator core and a second stator core and, positioning holes are previously formed in the terminal block mounting parts of the first stator core and the second stator core, and then the first stator core and the second stator core are positioned through the positioning holes when the first stator core and the second stator core are superposed on each other in the back-to-back manner so that the respective pluralities of pole teeth are disposed in opposite directions to each other, and after that, the terminal block is integrally formed on the terminal block mounting part by the insert molding or outsert molding.

12. The manufacturing method for a motor according to claim 11, wherein after the terminal blocks have been formed in the first stator core and the second stator core, the terminal block mounting parts of the first stator core and the second stator core are fixed to each other through the opening part.

* * * * *